Aug. 31, 1954     J. OPPENHEIMER     2,687,546

CASTER

Filed May 16, 1952     2 Sheets-Sheet 1

INVENTOR.
JESS OPPENHEIMER

BY

ATT'Y

Aug. 31, 1954  J. OPPENHEIMER  2,687,546
CASTER

Filed May 16, 1952  2 Sheets-Sheet 2

INVENTOR.
JESS OPPENHEIMER
BY
ATT'Y.

Patented Aug. 31, 1954

2,687,546

UNITED STATES PATENT OFFICE 2,687,546

CASTER

Jess Oppenheimer, West Los Angeles, Calif.

Application May 16, 1952, Serial No. 288,125

13 Claims. (Cl. 16—26)

This invention relates to casters adapted especially for quiet and easy movement of light and heavy members supported thereby. More particularly this invention relates to ball type casters designed for use with carts, dollies or the like requiring ease of movement and flexibility of control, and for installation where directional control and/or braking action are of importance. One important application of such casters is for use in dollies for movie or television cameras.

Conventional ball type casters are freely movable in any direction but do not have provision for satisfactory braking, nor are they designed to give a controlled movement in any given direction. The present invention however, is designed to provide a remedy for such defects.

It is therefore an object of this invention to provide a ball caster position within a housing and in engagement with ball bearings for easy relatively frictionless movement. It is a further object of the present invention to provide means for exerting a braking action on the ball and also to provide means for controlling the direction of rotation of the ball for permitting control of movement of the member supported by the caster in a given direction.

With these and other objects in view, the invention comprises the novel combination construction and arrangement of parts to be hereafter more fully described, claimed, and illustrated in the accompanying drawings, wherein:

Figure 1:
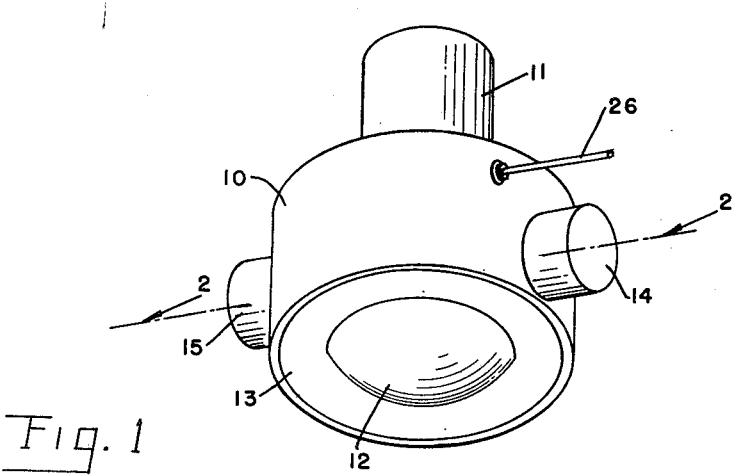
Figure 1 is a view in elevation of an improved caster constructed according to the invention, looking upward from the bottom thereof.
Figure 2:
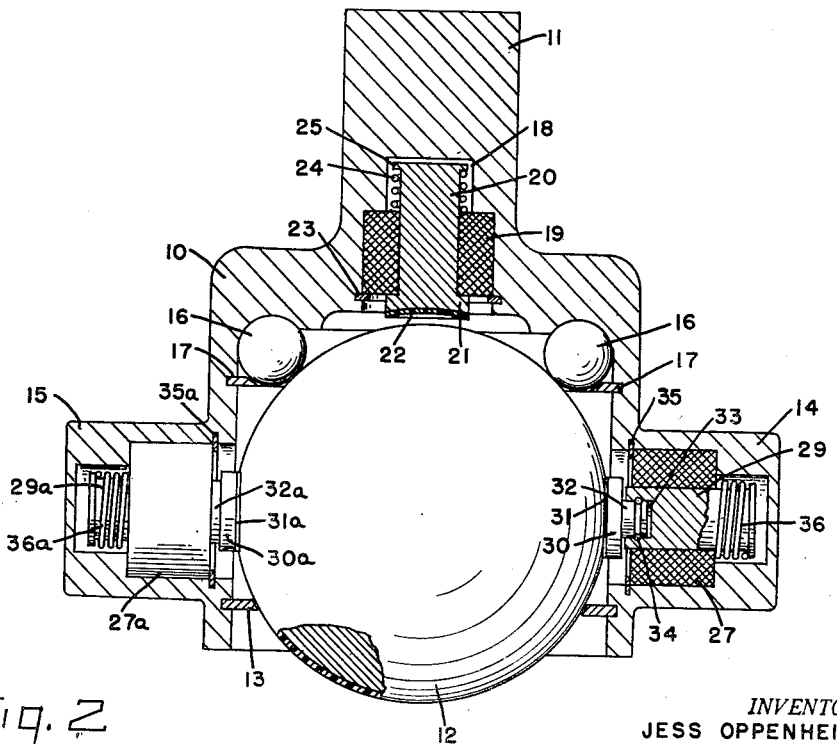
Figure 2 is a vertical cross-sectional view taken along lines 2—2 of Figure 1.

Referring more particularly to the drawings, element 10 in Figures 1 and 2 is a caster housing having a shank portion 11 for engagement with a leg or other portion of an object to be supported thereby. Normally three or more casters may be used depending on the article to be supported. Ball 12 forms the rotating member of the caster and is retained within the housing by means of retaining ring 13. The ball may be of steel or other metal, or may be of rubber or synthetic resin composition. A preferred form is to use a steel ball covered with a layer of rubber. Ball 12 is positioned for rotative support in the caster by engagement with a series of ball bearings 16 retained in the housing by ring 17. Positioned within recess 18 in shank member 11 is an electrically actuated solenoid brake which is composed of a solenoid winding enclosed in casing 19 and an armature member 20. The armature terminates in a shoe portion 21 which is faced with a friction material such as rubber, or brake lining material 22. The shoe and facing are preferably shaped to conform to the curvature of the ball 12. The solenoid member is retained within recess 18 by means of retaining ring 23. Spring 24 surrounds the armature member 20 and is mounted between shoulder 25 and the solenoid casing 19 in a compressed condition so that the armature is normally disengaged from the ball 12. On passage of current through the solenoid from an outside source through an electrical conduit as shown at 26 in Figure 1, armature 20 is thrust forward so that friction member 22 engages ball 12. On disconnection of the current the armature is disengaged by the pull of the spring. In this manner rotation of the ball may be controlled at will and braking effected thereby. Preferably, this braking member is positioned so that the armature will be reciprocable on an axis extending vertically of the ball through its midsection, but may, if desired, be positioned to engage the ball at any other angle.

Positioned within cylindrical housings 14 and 15 is another pair of solenoid brakes which are positioned to engage opposite sides of the ball 12 along its horizontal axis through its midsection. Each of these solenoid brakes is constructed of solenoid windings in casings 27 and 27a and armatures 29 and 29a reciprocably positioned within the casings. Each armature terminates in a rotatably mounted shoe 30 and 30a. Each shoe is faced with friction material 31 and 31a. Each shoe is mounted for rotation about its horizontal axis by means of stub shafts as shown at 32 and 32a held in position in a cylindrical recess 33 in the armature by means of a retaining ring 34 positioned in a groove on the shaft and in the recess. If desired, the ring on each brake may be replaced by a small ball bearing assembly to permit more frictionless rotation. Corresponding members are contained in the opposite solenoid braking means. The stub shaft may be lubricated by a suitable oil hole or may be housed in an oilless bearing inserted into the recess as is obvious to those skilled in the art. Each horizontal solenoid is retained in position by means of rings 35 and 35a. Each armature 29 and 29a with its attached rotatable shoe is maintained in a normally disengaged position by means of springs 36 and 36a. When current is passed through the solenoids the brake shoes are urged forward to bear against the ball as shown in Figure 2. It is apparent that when these brakes are engaged the ball is prevented from rotating except in a direction at right angles to the longitudinal axis along which the solenoids are mounted. In rotating in such direction, the shoes 31 and 31a and stub shafts 32 and 32a rotate along with the ball journaled in the bearing provided by the walls of recess 33, and its corresponding member in the other brake. When the current is discontinued the springs disengage the shoes and the ball is free to rotate in any direction as long as the brake shoe 21 is not engaged. Generally current is carried to the windings of solenoids in casings 27 and 27a simultaneously through independent leads which may also come through conduit 26.

Figure 3:
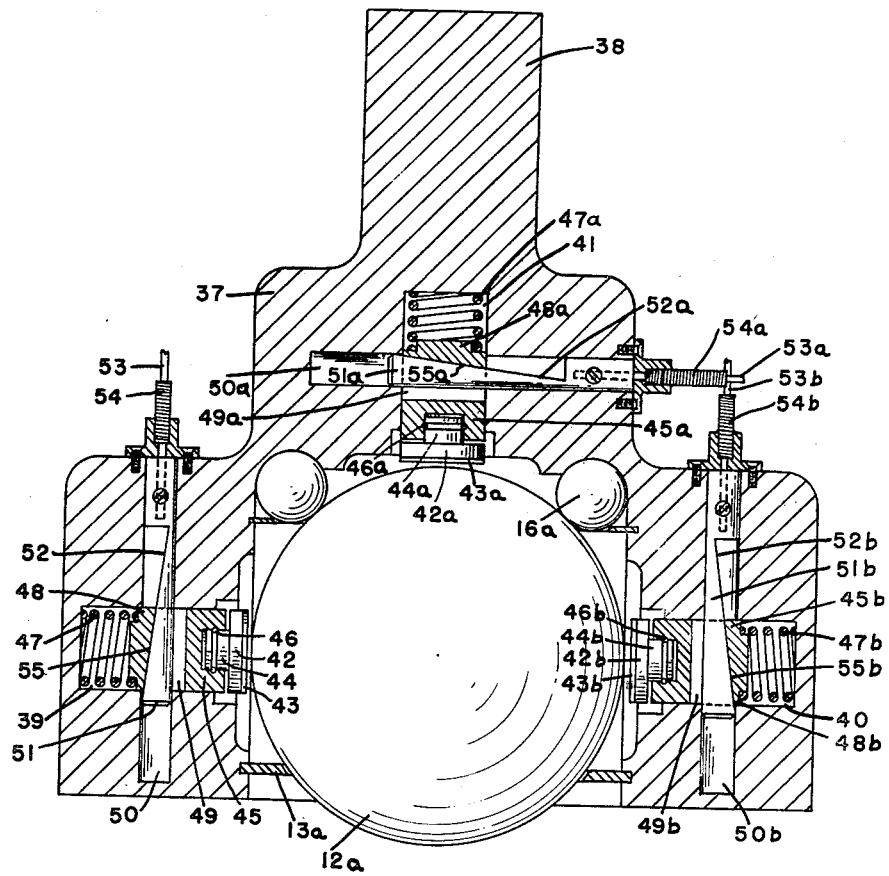
Figure 3 is a vertical cross-sectional view of a modified construction taken along a plane similar to that of Figure 2.

Figure 3 illustrates a cross section and an alternating form of the invention taken along a plane similar to Figure 2, in which the braking action is obtained by mechanical means. Housing 37 has a shank portion 38 for engagement with a socket on the leg of a member to be supported, or the platform of a dolly, etc. The housing contains cylindrical recesses 39, 40, and 41 in which are disposed reciprocable brake means. These brakes comprise brake shoes 42, 42a, and 42b each having a facing 43, 43a, and 43b of rubber or brake material, and each supported on a rotatable stub shaft 44, 44a, and 44b. These stub shafts are rotatably positioned in reciprocating piston members 45, 45a, and 45b, being held in place by retaining rings 46, 46a, and 46b. As in Figure 2, oil holes may be used for lubrication or oilite bearings may be used. The retaining rings may be replaced by ball bearing assemblies to permit relatively frictionless rotation of the shoes.

Each of the reciprocable pistons is engaged by springs 47, 47a, and 47b which bear against the back wall of the recesses and engage the pistons around shoulders 48, 48a, and 48b formed thereon. These springs are normally under compression so that they tend to force the pistons with their attached shoes against the ball 12a.

Each of the pistons is formed with rectangular cross-sectional openings 49, 49a, and 49b each of said openings has one wall thereof tapered as shown. Openings 50, 50a, and 50b are formed transverse to the pistons and each is in alignment with the opening in the corresponding piston when it is in a retracted position. Each opening has positioned in its a sliding cam 51, 51a, and 51b having a tapered portion shown at 52, 52a, and 52b. Each respective cam is engaged by a flexible shaft 53, 53a, and 53b housed in flexible housings 54, 54a, and 54b. Ball 12a is rotatably supported on bearings 16a and is retained by ring 13a as in Figure 2.

Immobilization or braking of the ball is obtained by sliding top cam member 51a forward by pushing the flexible shaft attached thereto as a result of which spring 47a will be enabled to force piston 45a downward with attached brake shoe 42a and its facing material into engagement with the ball. On pulling the shaft out the spring will be compressed and the piston will be forced back up with the sloping surface 55a riding on the cam.

In order to control the movement of the ball in a straight line direction, horizontally arranged brake shoes 42 and 42b are forced into engagement by operation of flexible shafts 53 and 53b in a manner similar to that described in connection with the top braking means. When these are engaged with the ball it can move only in a direction normal to the axis which extends through the brakes, the brake shoes and their stub shafts rotating therewith. The caster assembly may be pivoted or rotated about its vertical axis by engaging member 44a and its shoe with the ball, in view of the rotatable mounting of the stub shaft. This is important for directional control.

From the foregoing description it is apparent that casters are described permitting free movement of a member supported thereby in any desired direction, or which may be braked at will. Directional control may be obtained by turning the assembly on the casters in the desired direction, and by engaging the horizontal brakes, the assembly can then move only in the selected direction with the ball casters rotating on their horizontal axes.

It should be understood that it is not desired to limit this invention to the exact details of construction or use herein shown and described, for various modifications within the scope of the appended claims will occur to persons skilled in the art.

I claim:

1. A ball type caster comprising a housing open at one end thereof, a ball rotatably positioned in said housing and having a portion thereof projecting beyond the open end of the housing, brake means selectively engageable with and releasable from said ball and adapted to restrict movement thereof on the application of a force thereto and to release said ball on the removal of said force, means selectively engaging said brake means with or releasing said brake means from said ball, and means mounting said brake means for rotation in said housing when said brake means engages said ball.

2. A ball type caster according to claim 1 wherein the brake means comprises a brake shoe engaging the ball.

3. A ball type caster according to claim 1 wherein the brake means comprises a solenoid brake having a brake shoe attached to the armature of the solenoid and adapted to engage the ball on passage of electric current through the solenoid.

4. A ball type caster according to claim 1 wherein the brake means comprises a brake shoe engaging the ball, spring means normally urging said brake shoe into engagement with the ball, and means for retracting said spring and releasing said shoe from engagement with the ball.

5. A ball type caster comprising a ball rotatably positioned in a housing and projecting from an opening therein to engage a surface for movement of the caster thereon, braking means adapted to engage and disengage said ball, members engageable with said ball at opposite sides thereof along a plane along an axis of the ball parallel to the surface engaged by the ball, said members being rotatably positioned in said housing for rotation in said axis whereby said ball is permitted to rotate only in a direction normal to said axis when engaged by said members, and means selectively engaging said members with or releasing said members from said ball to confine said ball for rotation about said axis or enable said ball to move universally in said housing.

6. A ball type caster according to claim 5 wherein each of the members engaging the ball at opposite sides thereof comprises a solenoid actuated armature.

7. A ball type caster according to claim 5 wherein each of the members engaging the ball at opposite sides comprises a spring actuated member.

8. A ball type caster comprising a ball rotatably positioned within a housing and projecting through an opening therein for the engagement of a floor surface, a pair of braking means each positioned on opposite sides of said ball along an axis through the center of said ball parallel to said floor surface, each of said braking means being rotatable in said axis whereby rotation of said ball is permitted only in a direction normal to said axis upon engagement of said braking means with said ball.

9. A caster according to claim 8 wherein the braking means are solenoid brakes comprising electrically actuated armatures.

10. A caster according to claim 8 wherein the braking means are mechanically actuated members controlled by cam means for engagement and disengagement with said ball.

11. A ball type caster comprising a ball rotatably mounted on a housing and engageable with a surface for movement of the caster relative thereto, members on opposite sides of the ball rotatably supported by said housing for rotation about an axis passing through the center of said ball, and means selectively engaging said members with or releasing said members from said ball to confine said ball for rotation about said axis or enable said ball to move universally relative to said housing.

12. A ball type caster comprising a ball rotatably positioned on a housing and engageable with a surface for movement of the caster relative thereto, members on opposite sides of the ball rotatably supported by said housing for rotation about an axis passing through the center of said ball and substantially parallel to the surface engageable by the ball, and means selectively engaging said members with or releasing said members from said ball to confine said ball for rotation about said axis or enable said ball to move universally relative to said housing.

13. A ball type caster comprising a ball rotatably positioned on a housing and engageable with a surface for movement of the caster relative thereto, a member rotatably supported by said housing for rotation about an axis passing through the center of said ball, and means selectively engaging said member with or releasing said member from said ball to confine said ball for rotation about said axis or enable said ball to move universally relative to said housing.

References Cited in the file of this patent

UNITED STATES PATENTS

| Number | Name | Date |
| --- | --- | --- |
| 237,717 | Adgate | Feb. 15, 1881 |
| 289,896 | Daft | Dec. 11, 1883 |
| 600,172 | Rechsteiner | Mar. 8, 1898 |
| 875,245 | Darrow | Dec. 31, 1907 |
| 2,421,464 | Reiner | June 3, 1947 |

FOREIGN PATENTS

| Number | Country | Date |
| --- | --- | --- |
| 1,075 | Great Britain | of 1901 |